United States Patent
Bengtsson et al.

(10) Patent No.: US 10,382,117 B2
(45) Date of Patent: Aug. 13, 2019

(54) OPERATING A WIRELESS COMMUNICATION SYSTEM

(71) Applicant: Sony Mobile Communications Inc., Tokyo (JP)

(72) Inventors: Erik Bengtsson, Eslöv (SE); Zhinong Ying, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 16/085,301

(22) PCT Filed: Mar. 17, 2016

(86) PCT No.: PCT/EP2016/055874
§ 371 (c)(1),
(2) Date: Sep. 14, 2018

(87) PCT Pub. No.: WO2017/157450
PCT Pub. Date: Sep. 21, 2017

(65) Prior Publication Data
US 2019/0103909 A1  Apr. 4, 2019

(51) Int. Cl.
*H04B 7/10* (2017.01)
*H01Q 21/24* (2006.01)
(Continued)

(52) U.S. Cl.
CPC ............. *H04B 7/10* (2013.01); *H01Q 21/245* (2013.01); *H04B 7/0617* (2013.01);
(Continued)

(58) Field of Classification Search
CPC ...... Y02D 70/444; Y02D 70/442; H04B 7/10; H04B 7/0617; H04B 7/0626;
(Continued)

(56) References Cited

U.S. PATENT DOCUMENTS

| 7,206,554 | B1 | 4/2007 | Lindskog | |
|---|---|---|---|---|
| 2002/0164954 | A1* | 11/2002 | Jalali | H04B 7/0491 455/67.11 |

(Continued)

OTHER PUBLICATIONS

International Search Report and Written Opinion from counterpart International Patent Application No. PCT/EP2016/055874, dated Nov. 18, 2016; 13 pages.

*Primary Examiner* — Rahel Guarino
(74) *Attorney, Agent, or Firm* — Tucker Ellis LLP (57) ABSTRACT

A wireless communication system includes a first communication device having an antenna arrangement configured to adjust the polarization of a radio frequency signal to be transmitted via the antenna arrangement, and a second communication device. A first downlink pilot signal having a first polarization and a second downlink pilot signal having a second polarization are sent via the antenna arrangement of the first communication device. The downlink pilot signals are orthogonal to each other and the polarizations are different. The downlink pilot signals are received at an antenna arrangement of the second communication device. A combined power of the received downlink pilot signals is optimized by varying a combining information. The combined power is a function of the received downlink pilot signals and the combining information. The antenna arrangement of the first communication device is adjusted based on the combining information.

12 Claims, 3 Drawing Sheets

(51) Int. Cl.
*H04B 7/06* (2006.01)
*H04B 7/08* (2006.01)
*H04L 5/00* (2006.01)
*H04B 7/0413* (2017.01)

(52) U.S. Cl.
CPC ......... *H04B 7/0857* (2013.01); *H04L 5/0048* (2013.01); *H04B 7/0413* (2013.01)

(58) Field of Classification Search
CPC .. H04B 7/0634; H04B 7/0689; H04B 7/0857; H04B 7/024; H04B 7/0413; H04W 72/042; H04L 25/0224; H04L 5/0048; H01Q 1/242; H01Q 21/245
See application file for complete search history.

(56) References Cited

U.S. PATENT DOCUMENTS

| | | |
|---|---|---|
| 2003/0092379 A1 | 5/2003 | Brothers |
| 2008/0232502 A1 | 9/2008 | Wild |
| 2011/0050166 A1 | 3/2011 | Cook |

\* cited by examiner

OPERATING A WIRELESS COMMUNICATION SYSTEM

FIELD OF THE INVENTION

The present invention relates to wireless communication systems, in particular to a method and devices for operating a wireless communication system, for example a cellular multiple input and multiple output (MIMO) system.

BACKGROUND OF THE INVENTION

The increasing use of mobile voice and data communications requires a more efficient utilisation of available radio-frequency resources. In order to increase data transmission performance and reliability, the so-called multiple input and multiple output (MIMO) technology may be used in wireless radio telecommunication systems for transmitting information between a base station and a user equipment, for example mobile devices like mobile phones, mobile computers, tablet computers, wearable devices and stationary devices like personal computers or cash registers. MIMO systems may use multiple send and receive antennas at the base station as well as at the user equipment. The MIMO technology forms the basis for coding techniques which use the temporal as well as the spatial dimension for transmitting information. The enhanced coding provided in MIMO or systems allows the spectral and energy efficiency of the wireless communication to be increased.

The spatial dimension may be used by spatial multiplexing. The spatial multiplexing is a transmission technique in MIMO wireless communications to transmit independent and separately encoded data signals, so-called streams, from each of the multiple transmit antennas or a combination thereof. Therefore, the space dimension is reused or multiplexed more than one time.

If the transmitter is equipped with NT antennas and the receiver has NR antennas, the maximum spatial multiplexing order NS (the number of streams or the rank) is NS=min (NT, NR). This means that NS streams can be transmitted in parallel, ideally leading to an NS increase of the spectral efficiency (the number of bits per second and per Hz that that can be transmitted over the wireless channel). For example, a MIMO system with a base station having two antennas and a user equipment having two antennas may operate at a rank of up to 2 and is also called 2×2 MIMO, indicating the number of antennas at the base station and at the user equipment.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the FDMIMO technology is capable of supporting many users on the same time/frequency resource blocks simultaneously. This reduces interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic needs information about radio channel properties between the user equipment and the antennas of the base station. Vice versa, in order to adapt the transmit signal at each individual antenna of the user equipment, a user equipment logic needs information about the radio channel properties between the base station and the antennas of the user equipment.

For this purpose, a so-called channel sounding may be performed to determine the radio channel properties between the user equipment and the base station. For example, a pilot signalling scheme can be used for this purpose which allows the base station to set configuration antenna parameters for transmitting signals, so as to focus radio energy at the user equipment, or for receiving radio signals from the user equipment. Likewise, the pilot signalling scheme can be used to enable the user equipment to set antenna configuration parameters for transmitting signals, so as to focus radio energy at the base station, or for receiving radio signals from the base station.

In a sectorised full dimension MIMO, in each sector the base station may perform such a channel sounding. However, when the operational frequency increases and consequently the wavelength decreases, the antenna aperture becomes small and therefore multiple antennas may be utilised at the receiver to increase the received power. In particular in case of high transmission frequencies of for example 30 GHz or more and multiple antennas having small apertures, the reception sensitivity of the user equipment may significantly depend on polarisation of the transmitted radio-frequency signals. The channel sounding reveals only information about the radio-frequency channel characteristics between the user equipment in its current orientation and the base station.

In view of the above, there is a need in the art for methods and devices which address at least some of the above shortcomings of conventional MIMO systems. In particular, there is a need in the art for improving operation of a wireless communication system to reduce the power losses of wireless communications due to polarization misalignments.

SUMMARY OF THE INVENTION

According to the present invention, this object is achieved by the features of the independent claims. The dependent claims define embodiments of the invention.

According to the present invention, a method for operating a wireless communication system is provided. The communication system may comprise for example a wireless cellular telecommunication system supporting a so-called multiple input and multiple output technology. The wireless communication system comprises a first communication device, for example a base station, having an antenna arrangement configured to adjust a polarisation of a radio frequency signal to be transmitted via the antenna arrangement. The wireless communication system comprises furthermore a second communication device, for example a user equipment like a mobile telephone, a mobile computer, a tablet computer a wearable device or a mobile accessory. A wearable device or a mobile accessory may comprise a wearable computer, also known as body born computer or simply wearable, which is a miniature electronic device that may be worn by a user under, with or on top of clothing. According to the method, a first downlink pilot signal is sent via the antenna arrangement of the first communication device. The first downlink pilot signal has a first polarisation. A second downlink pilot signal is sent via the antenna arrangement of the first communication device.

The second downlink pilot signal has a second polarisation which is different from the first polarisation. For example, the first polarisation is orthogonal with respect to the second polarisation. Additionally, the first and second downlink pilot signals are orthogonal with respect to each other. For example, for achieving orthogonality, the first and second downlink pilot signals may be transmitted at different times according to a time division multiple access technology (TDMA), at different frequencies according to a frequency division multiple access technology (FDMA), or may be orthogonally coded according to a code division multiple access technology (CDMA). For example, the second downlink pilot signal is transmitted at a second time after the first downlink pilot signal has been transmitted at a first time, or the first and second pilot signals may be transmitted in different time or frequency blocks just as long as a coherence bandwidth (the bandwidth they are valid in) is wider and all frequencies of the channel are covered. The first downlink pilot signal is received at an antenna arrangement of the second communication device as a first received downlink pilot signal. The second downlink pilot signal is received at the antenna arrangement of the second communication device as a second received downlink pilot signal. A combined power of the first and second received downlink pilot signals is optimised, for example at the second communication device. The combined power is a function of the first received downlink pilot signal (for example a power or a value or an absolute value of the first received downlink pilot signal), the second received downlink pilot signal (for example a power or a value or an absolute value of the second received downlink pilot signal), and combining information relating to the first and second received downlink pilot signals. For optimising the combined power, the combining information is varied. In other words, the two downlink pilot signals having different polarisations are received at the second communication device and then a preferred polarisation for a current receiving situation of the second communication device is determined. Sending parameters of the antenna arrangement of the first communication device are adjusted based on the combining information. Thus, the first communication device may send payload data signals having a polarisation which maximises the combined power received at the second communication device. Therefore, an optimised communication with reduced power is enabled.

In detail, first an optimal polarization is derived for example by combining the two pilot signals with an optimal phase and amplitude gain (for example by using a maximum ratio combining, MRC, as will be described below). The phase and amplitude gain is the same for all antennas and the optimization may be done on the coherent combination of the signals from all antennas. In this first step the sum of the magnitudes (i.e. absolute values, not the complex levels) may be maximized. The second device (e.g. user equipment) is now aware of the optimal polarization. The second device (e.g. user equipment) may not be able to adjust the polarization, but for a frequency division duplexing (FDD) system this info needs to be shared with the first device (e.g. the base station). Next, in a second step, the second device (e.g. user equipment) may figure out how the contributions from the multiple antennas shall be combined, for example in order to achieve the coherent optimum. Again, the contribution from the different antennas (based on the polarization optimized settings applied to the pilots) may be combined by using a maximum ratio combining, MRC. The second step actually applies and derives beam forming settings needed for uplink communication. Now, the second device (e.g. user equipment) is able to transmit in the right direction within the coherence bandwidth. In other words, the second device (e.g. user equipment) tries to figure out optimal beam forming as if it received a signal with optimal polarization.

According to an embodiment, for adjusting the sending parameters of the antenna arrangement of the first communication device, the combining information is transmitted from the second communication device to the first communication device, and a third polarisation is determined based on the combining information. The third polarisation may comprise a polarisation which optimises the signal power received at the second communication device at its current location and orientation, for example at its current arrangement with respect to the first communication device. A payload information signal having the third polarisation is sent via the antenna arrangement of the first communication device. Transmitting the combining information from the second communication device to the first communication device may be in particular advantageously in case a frequency division demultiplexing is used where the uplink and downlink radio channel characteristics may be different and therefore required polarisations in uplink and downlink directions may be different.

According to an embodiment, optimising the combined power comprises applying a maximum ratio combining technique based on the first received downlink pilot signal, the second received downlink pilot signal, and the combining information. The maximum ratio combining technique is well-known in telecommunications as a method of diversity combining and is also known as ratio squared combining and pre-detection combining. The first and second downlink pilot signals may be combined with the combining information such that for example each downlink signal is rotated and weighted according to a phase and strength of the channel characteristics for the corresponding polarisation, such that the signals are combined to yield a maximum ratio between signal and noise.

For example, the combining information may comprise a phase information and weighting information. The combined power comprises a sum of an absolute value of the first received downlink pilot signal weighted based on the weighting information and phase shifted based on the phase information, and an absolute value of the second received downlink pilot signal weighted based on the weighting information. Based on such a combining information the first communication device is capable to send a downlink payload signal having a polarisation which enables the second communication device to receive the downlink payload signal with a high power gain and signal-to-noise ratio.

According to another embodiment, the antenna arrangement of the first communication device is configured to adjust a transmission direction of the radio frequency signal to be transmitted via the antenna arrangement. For example, the first communication device may have an antenna arrangement which provides a beamforming in several sectors around the base station. In each sector the base station may perform a corresponding channel sounding. In particular, when the first downlink pilot signal is sent to the second communication device, the transmission direction of the first downlink pilot signal is adjusted into a direction of the second communication device. Likewise, for sending the second downlink pilot signal, the transmission direction of the second downlink pilot signal is adjusted into the direction of the second communication device. Usually, the pilot signals used for channel sounding of channels to different second communication devices (for example user equipment devices) have to be orthogonal to avoid influencing each other. However, by beamforming and adjusting a transmission direction of the radio-frequency signals transmitted from the first communication device (for example a base station), the same pilot signals may be reused in every sector or in every second sector without influencing each other. Therefore, resources for orthogonal pilot signals may be saved.

According to another embodiment, the antenna arrangement of the second communication device comprises a plurality of antennas, for example two or more antennas. The first downlink pilot signal is received at each antenna of the plurality of antennas as the first received downlink pilot signal. In particular, the first received downlink pilot signal comprises a sum of absolute values of the first downlink pilot signals received at the plurality of antennas. Furthermore, the second downlink pilot signal is received at each antenna of the plurality of antennas as the second received downlink pilot signal. The second received downlink pilot signal comprises a sum of absolute values of the second downlink pilot signals received at the plurality of antennas of the second communication device. The combining information is varied such that the combined power of the first and second received downlink pilot signals is optimised, for example, the combining information is determined using the maximum ratio combining technique such that the combined power and a signal-to-noise ratio are maximised or at least enhanced. For example, a phase between the first and second received downlink pilot signals is correspondingly adapted and the first and second received downlink pilot signals are each weighted with a corresponding weight.

According to another embodiment, an antenna gain of the antenna arrangement of the second communication device is optimised. The combining information comprises a phase information and a weighting information. For each antenna of the plurality of antennas of the second communication device a corresponding downlink pilot signal power is determined. The corresponding downlink pilot signal power of each antenna depends on a sum of an absolute value of the first downlink pilot signal received via the corresponding antenna and weighted based on the weighting information and phase shifted based on the phase information, and an absolute value of the second downlink pilot signal received via the corresponding antenna and weighted based on the weighting information. In other words, for determining for each antenna of the plurality of antennas of the second communication device a corresponding downlink pilot signal power, the first and second received downlink pilot signals are modified based on the above described combining information and then a sum of these modified pilot signals is determined. The antenna gain is a function of the downlink pilot signal powers of each antenna of the plurality of antennas and further combining information relating to the downlink pilot signal powers. For optimising the antenna gain of the antenna arrangement of the second communication device, the further combining information is varied.

For example, the further combining information may comprise for each antenna of the second communication device a further phase information and a further weighting information. The antenna gain may be a function of a sum of the downlink pilot signal powers, each weighted based on the corresponding further weighting information and phase shifted based on the corresponding further phase information. Again, a maximum ratio combining technique may be used to optimise the antenna gain of the antenna arrangement. Based on the further combining information, receiving parameters of the antenna arrangement of the second communication device are adjusted. In other words, under the assumption that a signal with the optimal polarisation is received, the antenna gain of the antenna arrangement of the second communication device is optimised based on the polarisation optimised signal.

Additionally, according to another embodiment, an uplink pilot signal is sent via the antenna arrangement of the second communication device using the further combining information. The uplink pilot signal is received via the antenna arrangement of the first communication device at the first communication device as a received uplink pilot signal. A third polarisation is determined based on the received uplink pilot signal at the first communication device and a payload information signal having the third polarisation is sent via the antenna arrangement of the first communication device.

As described above, the first communication device may comprise for example a base station and the second communication device may comprise for example a user equipment. In this case, the polarisation of downlink signals sent from the base station to the user equipment may be optimised such that even when the user equipment is physically rearranged, for example rotated, an optimised communication with reduced power and high signal-to-noise ratio is possible.

It is to be noticed that the roles of the first communication device and the second communication device may be vice versa, that means that the first communication device may be a user equipment and the second communication device may be a base station. In this case, the term uplink relates to a communication from the base station to the user equipment, and the term downlink relates to the opposite communication direction from the user equipment to the base station. In particular, in case the user equipment is a stationary device, for example a cash register or a personal computer, optimising the communication based on adjusting the polarisation of the transmitted radio-frequency signals may be advantageous. Furthermore, the above-described method may be in particular advantageously used in connection with high frequency transmission systems, operating at frequencies of for example 20 GHz or above. Additionally, the first and second communication devices may both be user equipment devices, for example in a relay configuration or in device to device communication.

Furthermore, the term antenna arrangement may indicate an antenna structure or an antenna port to which multiple antenna elements may be coupled.

According to another aspect of the present invention, a communication device for a wireless communication system is provided. The communication device comprises an antenna arrangement configured to adjust the polarisation of a radio frequency signal to be transmitted via the antenna arrangement, and a logic coupled to the antenna arrangement. The logic is configured to send a first downlink pilot signal having a first polarisation via the antenna arrangement, and to send a second downlink pilot signal having a second polarisation via the antenna arrangement. The first and second downlink pilot signals are orthogonal to each other and the first and second polarisations are different. For example, the first polarisation is orthogonal with respect to the second polarisation. Furthermore, the logic is configured to determine combining information which is a result of an optimisation of a combined power of the first and second downlink pilot signals as they are received at a further communication device. The combined power is a function of the first downlink pilot signal as it is received at the further communication device, the second downlink pilot signal as it is received at the further communication device, and the combining information relating to the first and second downlink pilot signals as they are received at the further communication device. It should be noticed that the received power is a complex power value. For optimising the combined power, the combining information is varied. Finally, the logic is configured to adjust sending parameters of the antenna arrangement based on the combining information. Therefore, the communication device is configured to perform the above-described method and the embodiments thereof as the first communication device, for example at a base station.

According to the present invention, a further communication device for a wireless communication system is provided. The communication device comprises an antenna arrangement and a logic coupled to the antenna arrangement. The logic is configured to receive a first downlink pilot signal at the antenna arrangement as a first received downlink pilot signal, and to receive a second downlink pilot signal at the antenna arrangement as a second received downlink pilot signal. The first and second downlink pilot signals are sent at different times and have a different polarisation. Furthermore, the logic is configured to optimise a combined power of the first and second received downlink pilot signals by varying combining information relating to the first and second received downlink pilot signals. In particular, the combined power is a function of the first received downlink pilot signal, the second received downlink pilot signal, and the combining information relating to the first and second received downlink pilot signals. By varying the combining information, the combined power is optimised, for example such that the combined power becomes maximal by weighting and phase shifting the magnitudes (absolute values) of the first and second downlink pilot signals. Therefore, the communication device is configured to perform the above-described method as the second communication device, for example as a user equipment.

Finally, according to the present invention, a wireless communication system is provided comprising the above-described communication devices, at least one acting as the first communication device and at least one acting as the second communication device.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
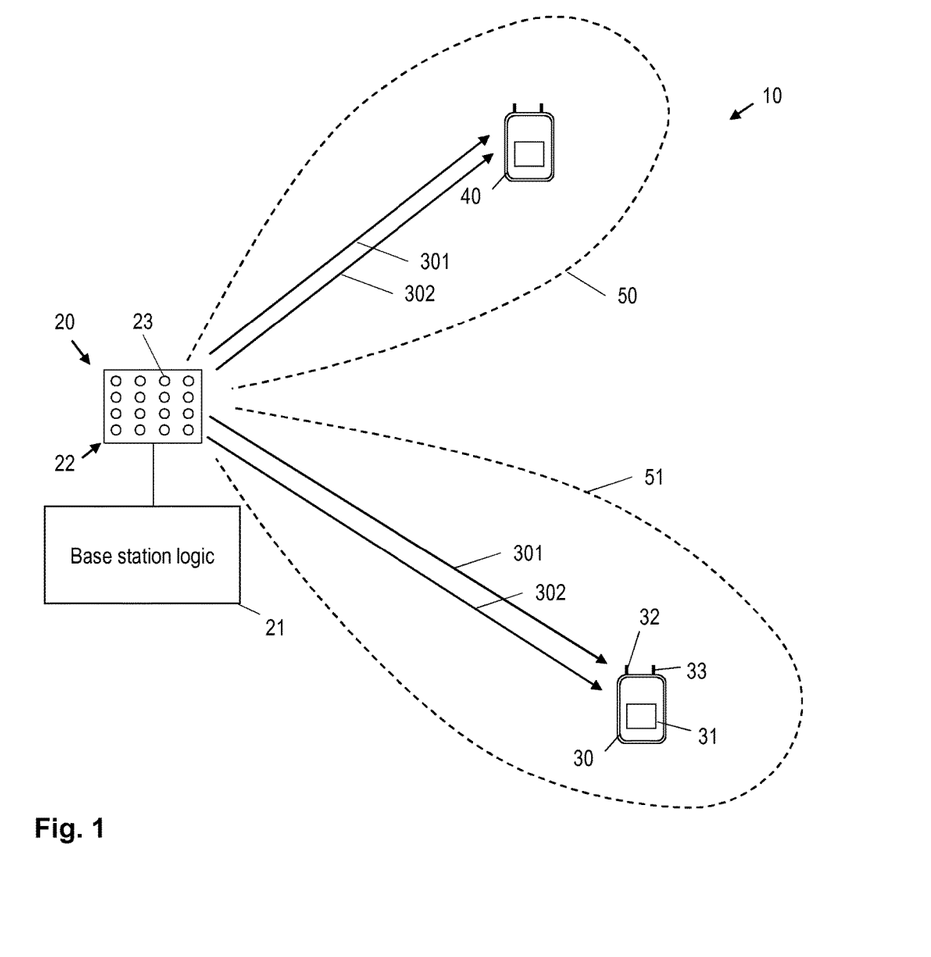
FIG. 1 shows schematically a cellular communication system according to an embodiment of the present invention.

FIG. 1 shows a wireless communication system 10 according to an embodiment. The wireless communication system 10 includes a base station 20 and a plurality of user equipment devices, of which two are shown in FIG. 1 which are designated by reference signs 30 and 40. The base station 20 may support a so called multiple input and multiple output (MIMO) technology and therefore the base station 20 may have a large number of antennas, for example several tens or in excess of one hundred antennas.

The base station 20 comprises an antenna arrangement 22 comprising a plurality of antennas which are indicated by circles in FIG. 1. One exemplary antenna of the plurality of antennas is referenced by reference signs 23. The antennas 23 may be arranged in a two-dimensional or three-dimensional antenna array on a carrier. The base station 20 may comprise furthermore associated (not shown) transceivers for the antennas 23. The base station 20 comprises furthermore a base station logic 21. The base station logic 21 is coupled to the antenna arrangement 22 and comprises for example a controller, a computer or a microprocessor. Although in FIG. 1 only one antenna arrangement 22 is shown, the base station 20 may comprise more than one antenna array, for example two, three, four or even more, for example several tens of antenna arrays, which may cooperate with each other and which may be arranged near to each other or spaced apart.

The antenna arrangement 22 may be configured to transmit radio-frequency signals into specific directions, so-called sectors. Two of these sectors are shown in FIG. 1 and indicated by reference signs 50 and 51. The configuration of the sectors 50, 51 may be static or dynamic. The transmission of radio-frequency signals into a specific direction may be achieved by beamforming technologies as it is known in MIMO systems.

In the communication system 10, as shown in FIG. 1, a plurality of user equipment devices like mobile phones, mobile and stationary computers, tablet computers, smart wearable devices or smart mobile devices may be arranged. Two exemplary user equipment devices 30 and 40 are shown in FIG. 1. Each of the user equipment devices 30 and 40 may be configured to communicate with the base station 20.

In the following, the user equipment 30 will be described in more detail. However, the user equipment 40 may comprise similar features as the user equipment 30 and may therefore act similarly. The user equipment 30 comprises one or more antennas. In the exemplary embodiment shown in FIG. 1, the user equipment 30 comprises two antennas 32 and 33. Furthermore, the user equipment 30 comprises a logic 31. The logic 31 may comprise for example a controller or microprocessor. The user equipment 30 may comprise more components, for example a graphical user interphase and a battery, but these components are not shown in FIG. 1 for clarity reasons. The antennas 32, 33 of the user equipment 30 may be arranged spaced apart from each other, for example, the two antennas 32 and 33 may be arranged at a top side of the user equipment near the edges. As an alternative, one or more antennas may be arranged at the top side and some other antennas may be arranged at a bottom side of the user equipment 30.

Operation of the base station 20 in connection with the user equipment devices 30 and 40 will be described in more detail in connection with FIG. 2. Although in FIG. 2, reference will mainly be made to user equipment 30, the same operational steps may be performed between the base station 20 and the user equipment 40.

Figure 2:
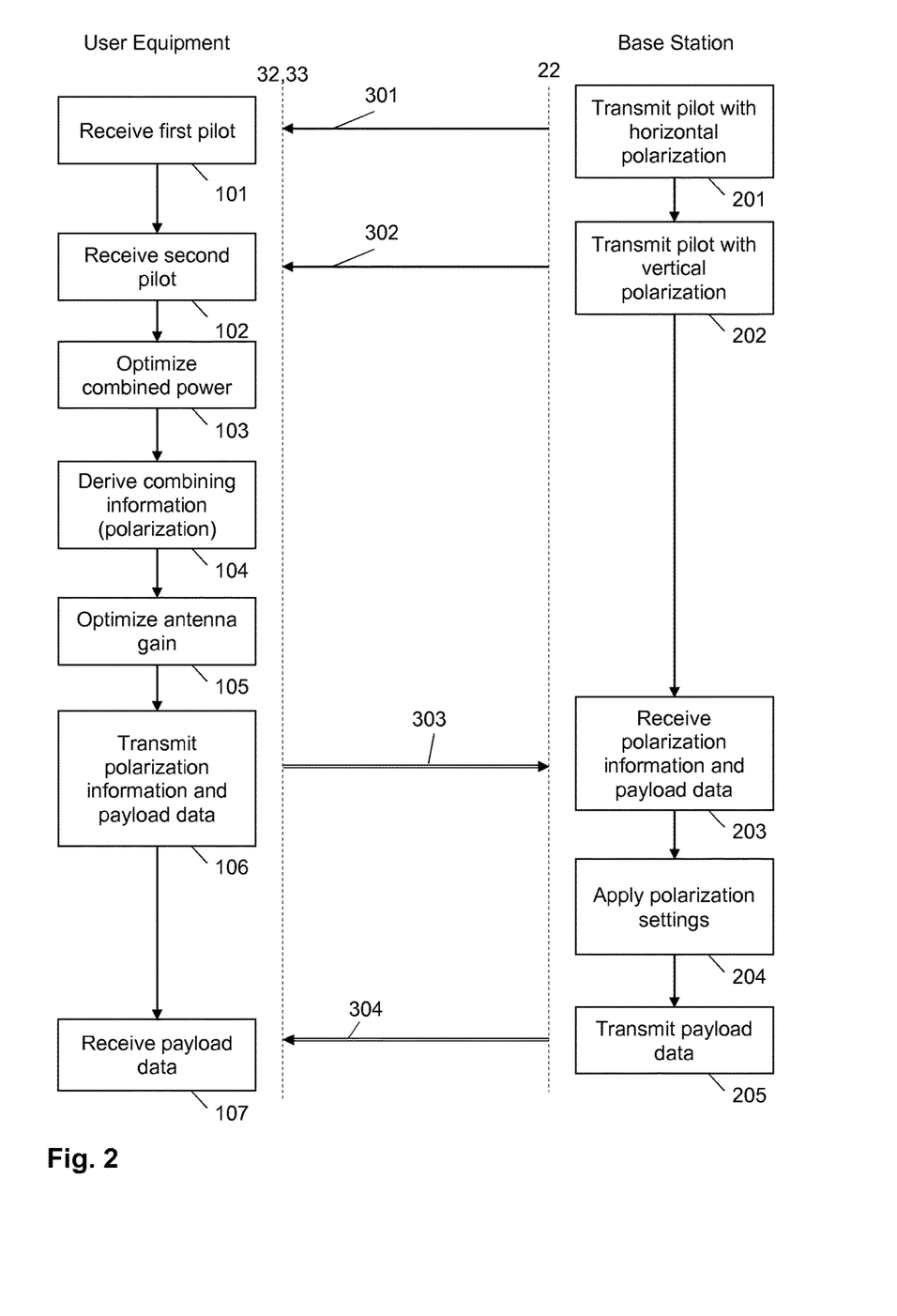
FIG. 2 shows a flowchart comprising method steps according to an embodiment of the present invention.

FIG. 2 shows a flowchart with method steps 101 to 107 performed by the user equipment 30 and method steps 201 to 205 performed by the base station 20. Furthermore, the transmission of radio signals between the antennas 32, 33 of the user equipment 30 and the antenna arrangement 22 of the base station 20 is indicated in FIG. 2 by arrows 301 to 304. In particular, the dashed line 32, 33 represents the antennas 32, 33 of the user equipment 30 and dashed line 22 represents the antenna arrangement 22 of the base station 20. It should be noticed that in FIG. 2 an arrow formed of a single line represents a radio signal transmission of a pilot signal or a control signal, and an arrow formed of a double line represents the radio signal transmission of payload data.

In step 201 the base station 20 transmits a first downlink pilot signal 301 with a first polarisation to the user equipment 30. For example, the first downlink pilot signal may be transmitted directed by beamforming to the user equipment 30. Thus, another communication between the base station 20 and the user equipment 40 may not be disturbed by the transmission of the first downlink pilot signal 301. Due to the directional transmission, another or the same downlink pilot signal may be transmitted to the user equipment 40 at the same time as indicated by the second arrow 301 in FIG. 1. In step 101 the user equipment 30 receives the first downlink pilot signal 301. The first polarisation of the first downlink pilot signal 301 may be for example a horizontal polarisation. After the first downlink pilot signal 301 has been transmitted, the base station 20 transmits in step 202 a second downlink pilot signal 302 to the user equipment 30. The second downlink pilot signal 302 has a second polarisation which is different from the first polarisation, for example the second polarisation is a vertical polarisation. As shown in FIG. 1, the second downlink pilot signal having the second polarisation may also be transmitted at the same time to the user equipment 40 as indicated by the second arrow 302 in FIG. 1. In step 102 the second downlink pilot signal 302 is received at the user equipment 30. The first and second downlink pilot signals 301, 302 are orthogonal to each other, for example by using a time division multiple access technology (TDMA) as described above, a frequency division multiple access technology (FDMA), or a code division multiple access technology (CDMA). When using FDMA or CDMA, the first and second downlink pilot signals 301, 302 may be transmitted at the same time.

After the user equipment 30 has received the first and second downlink pilot signals 301, 302, the logic 31 optimizes in step 103 a combined power which is related to the first and second received downlink pilot signals such that the combined power of the first and second received downlink pilot signals 301, 302 may be maximized. The combined power is a function of the first downlink pilot signal 301 as it is received at the antennas 32, 33 of the user equipment 30, the second downlink pilot signal 302 as it is received at the antennas 31, 32 of the user equipment 30, and a combining information. As a result of the optimization the combining information is derived in step 104. Details on this optimisation of the combined power will be described in more detail below in connection with FIG. 3. The combining information comprises for example details on a required polarization of signals from the base station to achieve the optimized combined power.

In step 105, the user equipment 30 optimizes its antenna gain based on the combining information determined in step 104. Details for optimizing the antenna gain in step 105 will be described in more detail below in connection with FIG. 3.

In step 106 the user equipment 30 transmits the determined combining information 303 along with payload data which is received in step 203 at the base station 20. The combining information may comprise a phase information and a weighting information. During optimisation in step 103 the phase information and weighting information is varied such that, when combining the first and second downlink pilot signals by the phase information and the weighting information, the resulting combined power of the first and second received downlink pilot signals becomes a maximum. The maximum may be an absolute maximum or at least a relative maximum. Based on the combining information received from the user equipment 30, the base station 20 may determine in step 204 a polarisation which may be used for sending subsequent payload data 304 in step 205 to the user equipment 30 resulting in an optimized communication with high power efficiency and signal-to-noise ratio. The polarisation for transmitting downlink payload data from the base station 20 to the user equipment 30 may be determined based on the combining information.

To sum up, in step 203 the base station 20 receives the combining information, and determines in step 204 a corresponding transmit polarisation for a transmission of payload data in step 205. Based on the determined transmit polarisation the base station 20 may configure its transmission parameters of the antenna arrangement 22 to achieve the determined transmit polarisation.

Finally, in step 107 the user equipment 30 receives the payload data 304 from the base station 20. Thus, a payload data transmission from the base station 20 to the user equipment 30 may be accomplished which uses an optimised polarisation for the communication between the base station 20 and the user equipment 30. The optimal polarisation may vary when the user equipment 20 changes its orientation or the properties of the radio channel between the base station 20 and the user equipment 30 varies. Therefore, the first and second downlink pilot signals 301 and 302 may be repeatedly sent in predetermined intervals or whenever the communication degrades to keep the transmit polarisation used by the base station 20 up-to-date with respect to the current orientation of the user equipment 30 and the properties of the radio channel.

Figure 3:
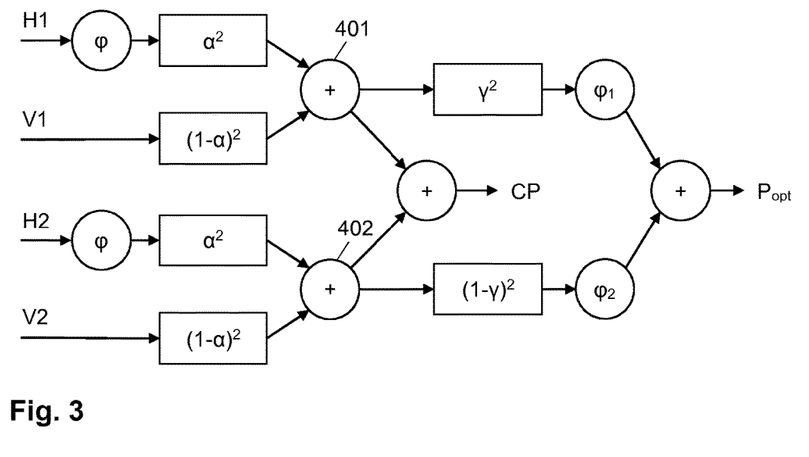
FIG. 3 shows schematically an algorithm for optimising a combined power of received pilot signals and an antenna gain according to an embodiment of the present invention.

FIG. 3 shows details concerning the optimisation of the combined power and the antenna gain of steps 103 and 105 of FIG. 2 mentioned above. In the following description, it is assumed that the first pilot signal 301 has a horizontal polarisation and the second pilot signal 302 has a vertical polarisation. However, other polarisations may be used as long as the polarisation of the first pilot signal 301 is different from the polarisation of the second pilot signal 302. Furthermore, in the following exemplary explanation, the user equipment 30 is assumed to have two antennas. Nevertheless, the method described in the following may support any number of antennas at the user equipment, for example one antenna or more than two antennas. Details thereon will be noticed below.

First, the optimisation of the combined power will be described. The combined power is abbreviated in FIG. 3 by CP. As an input, the received pilot signals 301, 302 with the horizontal and vertical polarisation are used. The downlink pilot signal 301 with the horizontal polarisation received at the first antenna 32 of the user equipment 30 is indicated by H1. The downlink pilot signal 302 having the vertical polarisation and which is received at the first antenna 32 is indicated by V1. The downlink pilot signal 302 with the horizontal polarisation which is received at the second antenna 33 of the user equipment 30 is indicated by H2, and the downlink pilot signal 302 with the vertical polarisation received at the second antenna 33 is indicated by V2. The following processing of the received signals H1, V1, H2 and V2 may be performed in the logic 31. Absolute values of the received signals H1 and H2 are phase shifted by a phase information $\varphi$. It is to be noticed that the same phase information $\varphi$ is used for phase shifting the signals H1 and H2. In case more than two antennas are used for receiving the horizontally polarised downlink pilot signal, the same phase information $\varphi$ is used for all these signals. Next, the phase shifted signal H1 is weighted by a weighting factor $\alpha^2$, and the signal V1 is weighted by a complementary weighting information $(1-\alpha^2)$. The same weighting is performed for absolute values of the signals H2, V2 received at the second antenna, that means that the phase shifted signal H2 is weighted with weighting information $\alpha$, and the signal V2 is weighted with the weighting information $(1-\alpha)^2$. In case of more than two antennas each pair of vertical and horizontal signals is weighted as described above with the same weighting information. Then, for each antenna the resulting horizontal and vertical powers are added (see reference signs 401 and 402). Finally, the combined power CP is the sum of the powers determined for each antenna. Thus, the combined power CP is a function of the pilot signals received at the antennas 32, 33 of the user equipment 30 and the phase information $\varphi$ and the weighting information $\alpha$. The following formula shows this in detail:

$$CP = f((|H1|+|H2|)e^{j\varphi}\alpha^2 + (|V1|+|V2|)(1-\alpha)^2)$$

For optimising the combined power CP, the phase information $\varphi$ and the weighting information $\alpha$ may be varied. In particular, a so-called maximum ratio combining technique may be applied to vary these parameters $\varphi$ and $\alpha$ for obtaining an optimised combined power CP. The above-mentioned combining information comprises the phase information $\varphi$ and the weighting information $\alpha$, which may be used by the base station logic 21 to configure its transmission parameters of the antenna arrangement 22 such that payload data signals 304 may be transmitted having a polarisation which leads to an optimised communication at low power with high signal-to-noise ratio.

For optimising the antenna gain Popt (step 105 of FIG. 2), a further maximum ratio combining technique may be applied based on the optimised receive power 401, 402 for each antenna. As can be seen from FIG. 3, each antenna power 401, 402, which comprises for each antenna the optimised combined powers of the horizontally and vertically polarised downlink pilot signals, is weighted with a corresponding weighting information and phase shifted with a corresponding phase information. The weighting information is individual for each antenna. The weighting may be based on weighting factors for adding the signal levels. Therefore, the sum of the weighting factors over all antennas may be normalised to one. As the powers are added to optimise the antenna gain Popt, the weighting information may comprise the squared weighting factors. In case of only two antennas, the weighting factors may be $\gamma$ and $(1-\gamma)$ and consequently, the weighting information is $\gamma^2$ and $(1-\gamma)^2$ as indicated in FIG. 3. In case of more than two antennas, different weighting factors may be used, wherein the sum is also one. The optimised antenna powers 401 and 402 are each weighted by their corresponding weighting information and phase shifted by their corresponding phase information and finally added resulting in the optimised received power Popt. For optimisation the weighting information $\gamma^2$ and $(1-\gamma)^2$ and phase information $\varphi_1$ and $\varphi_2$ may be varied in the following formula:

$$Popt = f(\gamma^2 e^{j\varphi_1}(H1 e^{j\varphi}\alpha^2 + V1(1-\alpha)^2) + (1-\gamma)^2 e^{j\varphi_2}(H2 e^{j\varphi}\alpha^2 + V2(1-\alpha)^2))$$

The signals H1, H2, V1 and V2 may comprise absolute values of the corresponding received downlink pilot signals.

When receiving payload data 304 in step 106, the user equipment 30 may use the weighting information $\gamma^2$ and $(1-\gamma)^2$ and $\varphi_1$ and $\varphi_2$ for weighting and phase aligning signals received at the antennas 32 and 33, thus yielding an optimum antenna gain.

To sum up, according to the method described above, at each antenna of the user equipment 30 two pilot signals having a different polarization are received, and based on these pilot signals it is possible to determine a preferred polarisation for that specific antennas and scenario (orientation of the user equipment and properties of the radio channel). This information may be communicated to the base station 20 which then transmits subsequent payload data 304 using this preferred polarisation. Under the assumption that a payload signal with the optimal polarisation is received, the user equipment 30 may combine the signals from its antennas to optimise the antenna gain. It is to be noted that the above described method does not increase the rank of the transmission between the base station 20 and the user equipment 30. However, due to the optimisation of the polarisation of the transmitted radio-frequency signals, communication quality may be enhanced such that a higher signal-to-noise ratio may be achieved even at lower power levels. Therefore, the above-described method may be in particular advantageous in connection with very high frequencies, for example above 30 GHz, in particular for example at 80 GHz, where antenna aperture becomes small.

The invention claimed is:
1. A method for operating a wireless communication system, the communication system comprising a first communication device having an antenna arrangement configured to adjust a polarization of a radio frequency signal to be transmitted via the antenna arrangement, and a second communication device, the method comprising:
sending a first downlink pilot signal having a first polarization via the antenna arrangement of the first communication device,
sending a second downlink pilot signal having a second polarization via the antenna arrangement of the first communication device, wherein the first and second downlink pilot signals are orthogonal to each other and the first and second polarizations are different,
receiving the first downlink pilot signal at an antenna arrangement of the second communication device as a first received downlink pilot signal,
receiving the second downlink pilot signal at the antenna arrangement of the second communication device as a second received downlink pilot signal,
optimizing a combined power of the first and second received downlink pilot signals, the combined power being a function of the first received downlink pilot signal, the second received downlink pilot signal, and combining information relating to the first and second received downlink pilot signals, wherein the combining information is varied for optimizing the combined power, and adjusting sending parameters of the antenna arrangement of the first communication device based on the combining information.

2. The method according to claim 1, wherein adjusting the sending parameters of the antenna arrangement of the first communication device comprises:
   transmitting the combining information from the second communication device to the first communication device,
   determining a third polarization based on the combining information, and
   sending a payload information signal having the third polarization via the antenna arrangement of the first communication device.

3. The method according to claim 1, wherein optimizing the combined power comprises applying a maximum-ratio combining technique based on the first received downlink pilot signal, the second received downlink pilot signal, and the combining information.

4. The method according to claim 1, wherein the antenna arrangement of the first communication device is configured to adjust a transmission direction of the radio frequency signal to be transmitted via the antenna arrangement,
   wherein sending the first downlink pilot signal comprises adjusting the transmission direction of the first downlink pilot signal into a direction of the second communication device, and
   wherein sending the second downlink pilot signal comprises adjusting the transmission direction of the second downlink pilot signal into the direction of the second communication device.

5. The method according to claim 1, wherein the orthogonality between the first downlink pilot signal and the second downlink pilot signal is achieved by using at least one technology of a group comprising:
   a time division multiple access technology,
   a code division multiple access technology, and
   a frequency division multiple access technology.

6. The method according to claim 1, wherein the combining information comprises a phase information and a weighting information, wherein the combined power comprises a sum of:
   an absolute value of the first received downlink pilot signal weighted based on the weighting information and phase shifted based on the phase information, and
   an absolute value of the second received downlink pilot signal weighted based on the weighting information.

7. The method according to claim 1, wherein the antenna arrangement of the second communication device comprises a plurality of antennas,
   wherein receiving the first downlink pilot signal at the antenna arrangement of the second communication device comprises:
      receiving the first downlink pilot signal at each antenna of the plurality of antennas, wherein the first received downlink pilot signal comprises a sum of absolute values of the first downlink pilot signals received at the plurality of antennas, and
   wherein receiving the second downlink pilot signal at the antenna arrangement of the second communication device comprises:
      receiving the second downlink pilot signal at each antenna of the plurality of antennas, wherein the second received downlink pilot signal comprises a sum of absolute values of the second downlink pilot signals received at the plurality of antennas.

8. The method according to claim 7, wherein the combining information comprises a phase information and a weighting information, the method further comprising:
   determining for each antenna of the plurality of antennas of the second communication device a corresponding downlink pilot signal power depending on a sum of
      an absolute value of the first downlink pilot signal received via the corresponding antenna and weighted based on the weighting information and phase shifted based on the phase information, and
      an absolute value of the second downlink pilot signal received via the corresponding antenna and weighted based on the weighting information,
   optimizing an antenna gain of the antenna arrangement of the second communication device, the antenna gain being a function of the downlink pilot signal powers and further combining information relating to the downlink pilot signal powers, wherein the further combining information is varied for optimizing the antenna gain, and
   adjusting receiving parameters of the antenna arrangement of the second communication device based on the further combining information.

9. The method according to claim 8, wherein the further combining information comprises for each antenna of the second communication device a further phase information and a further weighting information, wherein the antenna gain is a function of a sum of the downlink pilot signal powers, each weighted based on the corresponding further weighting information and phase shifted based on the corresponding further phase information.

10. The method according to claim 8, wherein adjusting the sending parameters of the antenna arrangement of the first communication device comprises:
   sending an uplink pilot signal via the antenna arrangement of the second communication device using the further combining information,
   receiving the uplink pilot signal via the antenna arrangement of the first communication device as a received uplink pilot signal,
   determining a third polarization based on the received uplink pilot signal, and
   sending a payload information signal having the third polarization via the antenna arrangement of the first communication device.

11. A communication device for a wireless communication system, the communication device comprising:
   an antenna arrangement configured to adjust a polarization of a radio frequency signal to be transmitted via the antenna arrangement, and
   a logic coupled to the antenna arrangement and configured to send a first downlink pilot signal having a first polarization via the antenna arrangement,
      send a second downlink pilot signal having a second polarization via the antenna arrangement, wherein the first and second pilot signals are orthogonal to each other and the first and second polarizations are different,
      determine combining information, the combining information being a result of an optimization of a combined power of the first and second downlink pilot signals as they are received at a further communication device, the combined power being a function of the first downlink pilot signal as it is received at the further communication device, the second downlink pilot signal as it is received at the further communication device, and the combining information relating to the first and second downlink pilot signals as they are received at the further communication device, wherein the combining information is varied for optimizing the combined power, and adjust sending parameters of the antenna arrangement based on the combining information.

12. A communication device for a wireless communication system, the communication device comprising:

an antenna arrangement, and a logic coupled to the antenna arrangement and configured to receive a first downlink pilot signal at the antenna arrangement as a first received downlink pilot signal, receive a second downlink pilot signal at the antenna arrangement as a second received downlink pilot signal, wherein the first and second downlink pilot signals are orthogonal to each other and have a different polarization, optimize a combined power of the first and second received downlink pilot signals, the combined power being a function of the first received downlink pilot signal, the second received downlink pilot signal and combining information relating to the first and second received downlink pilot signals, wherein the combining information is varied for optimizing the combined power.

* * * * *